July 18, 1961
L. SCHMIDT
2,992,508
FISHING FLOAT
Filed Sept. 6, 1957
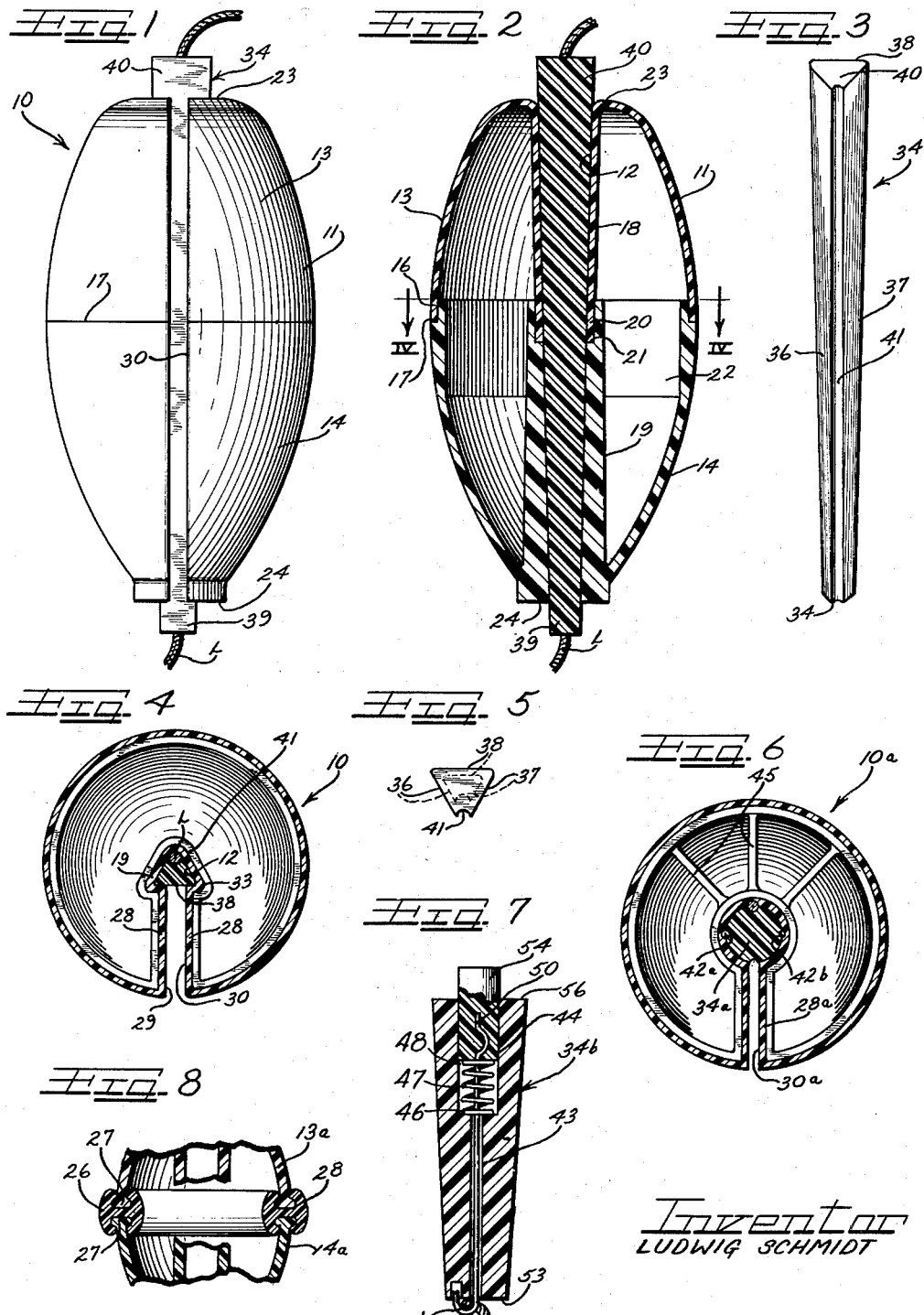
Inventor
LUDWIG SCHMIDT

United States Patent Office 2,992,508
Patented July 18, 1961

2,992,508
FISHING FLOAT
Ludwig Schmidt, % Master Products Co.,
Montague, Mich.
Filed Sept. 6, 1957, Ser. No. 682,330
7 Claims. (Cl. 43—44.91)

This invention relates generally to fishing floats and more particularly relates to a fishing float comprising a float body having a generally centrally disposed passage with a slot parallel to the passage intersecting the walls of the passage and the side walls of the float body to receive a fishing line, pin means being provided in the passage for locking the float to the fishing line.

It is an object of the present invention to provide a fishing float which may be quickly and conveniently locked in adjustable positions on a fishing line.

Another object of the present invention is to provide a fishing float which constitutes a reduced number of simplified parts and which may be manufactured economically.

Many other advantages, features and additional objects of the present invention will become manifest to those versed in the art upon making reference to the detailed description which follows and the accompanying sheet of drawings in which a preferred structural embodiment of a fishing float incorporating the principles of the present invention is shown by way of illustrative example.

On the drawings:

FIGURE 1 is a side elevational view of a fishing float incorporating the principles of the present invention;

FIGURE 2 is a cross-sectional view of the fishing float shown in FIGURE 1 taken through the center of the float;

FIGURE 3 is a perspective view of the locking pin incorporated in the fishing float of FIGURES 1 and 2;

FIGURE 4 is a cross-sectional view taken generally through the center of the float of FIGURE 1 and looking downwardly;

FIGURE 5 is a cross-sectional view of the locking pin shown in FIGURE 3;

FIGURE 6 is a cross-sectional view similar to FIGURE 4, but showing an alternative configuration of parts;

FIGURE 7 is a modified embodiment of a locking gin provided in accordance with the principles of the present invention; and FIGURE 8 is a fregmentary cross-sectional view showing an alternative embodiment of assembly means.

As shown on the drawings:

The float of the present invention is indicated generally at 10 and comprises a float body 11 which is particularly characterized by having a generally centrally disposed passage extending therethrough as at 12 so as to intersect opposite surface portions of the float body 11.

It will be appreciated that the float body 11 can be made of any suitable buoyant means, for example, a body of cork or foam plastic such as the foam-type of styrene, although in the embodiment described by way of illustrative example in the present disclosure, there is provided a float body comprising a pair of fitted-together parts including a body part 13 and a body part 14. As shown in FIGURE 2, the body part 13 constitutes a generally cup-shaped shell member and has a peripheral edge 16 received in a peripheral recess 17 formed on the cup-shaped shell member forming the body part 14.

Both body parts 13 and 14 have centrally disposed post or partition portions 18 and 19, respectively, which extend towards one another and in this embodiment, the centrally disposed passage 12 is formed to extend through the fitted-together partition portions 18 and 19.

The partition portion 18 of the body part 13 has a terminal edge 20 received in a recess 21 formed in the adjoining edge portion of the partition portion 19 of the body part 14.

By providing separate body parts 13 and 14, different colored plastic materials may be selected and prior to mechanical assembly, a small amount of a suitable solvent may be introduced into the hollow annular space 22 of the float body 11. Thus, after mechanical assembly of the parts 13 and 14, and agitation of the solvent within the hollow space 22, a sealed and bonded joint will be formed at the line of juncture between the partition portions 18 and 19 and specifically between the adjoining edge portions and the recesses 17 and 21 of the partition portions 18 and 19, and the outer wall portions of the body parts 13 and 14.

As shown in FIGURES 1 and 2, the float body 11 may be generally oval in configuration and may be provided with flattened end portions such as shown at 23 and 24, respectively. The passage 12 intersects the surface portions 23 and 24 at opposite ends of the float body 11.

As shown in FIGURE 8, fitted-together body parts may be joined in other ways. For example, in FIGURE 8 an annular sealing gasket of flexible material and indicated at 26 may be interposed between the upper and lower body parts here indicated at 13a and 14a. The body parts 13a and 14a and the annular gasket 26 are particularly characterized by the provision of interfitting groove and detent means whereby a snap-together assembly is effected between the parts. For example, the peripheral edges of the body parts 13a and 14a have outwardly extending tongues 27 formed thereon and the gasket member 26 has correspondingly-shaped grooves 28 formed therein. Thus, the tongue and groove connection insures that the parts are locked in assembly with one another and in sealed-together relation.

As shown in FIGURE 3, the cross-sectional configuration of the passage 12 is that of an equilateral triangle, however, any suitable cross-sectional configuration can be provided and in this regard reference is made to FIGURE 6 wherein a cylindrical passage 12a is formed in an alternative embodiment of fishing float indicated generally at 10a.

Also, as is clearly shown in FIGURES 4 and 6, the internal partition portions 18 and 19 include not only the centrally disposed parts forming the passage 12, but also laterally extending wall portions shown at 28 which merge with the peripheral walls as at 29. There is thus formed a slot 30 which extends generally axially or longitudinally of the float body 11 parallel to the passage 12, the slot 30 intersecting the side walls of the float body 11 adjacent the point of merger 29 and also intersecting the passage 12 so that a fishing line can be readily passed through the slot 30 and into the passage 12 to extend completely through the float close to the center axis thereof.

In the form of FIGURE 4 wherein the cross-sectional shape of the post portion and the passage 12 is triangular, it will be noted that the slot 30 intersects the passage 12 medially of one of the legs of the equilateral triangle, the passage 12 being disposed so that one of the apical portions 31 is disposed directly opposite the slot 30, while the other apical portions 32 and 33, respectively, lie on opposite sides of the slot 30.

In the cylindrical form of the post portion and the passage 12a, as shown in FIGURE 6, the wall portions 28a provide a slot 30a which intersects the cylindrical passage 12a at a point in alignment with the passage axis.

In FIGURES 1 and 2, a fishing line indicated by the legend L is shown positioned within the passage 12 and extending out of opposite ends of the fishing float close to the float axis. In order to selectively lock the float in adjusted position along the length of the line L, it is contemplated according to the principles of the present invention to provide a pin means in the passage 12 which is indicated generally at 34. The pin means 34 generally conforms in cross-sectional configuration to the cross-sectional configuration of the passage 12 in which it is received. Moreover, the walls of the passage 12 and the peripheral walls of the pin means 34 are particularly characterized by having at least portions thereof formed to provide an interlock to retain the parts in assembled-together relation. Thus, in the illustrative embodiment of FIGURES 1–4, it will be noted that the pin means 34 comprises an elongated pin of generally triangular cross-section. Moreover, both the walls of the passage 12 and the peripheral walls of the pin means 34, as shown at 36, 37 and 38, respectively, are tapered in longitudinal direction to effect a wedging friction lock when the pin means 34 are inserted into the passage 12 from one end of the float. For example, the lower end of the passage 12 adjacent the surface 24 and the lower end 39 of the pin means 34 can conveniently comprise the small end, whereas an opposite end 40 of the pin means 34 and the end of the passage 12 adjacent the surface 23 can conveniently comprise a large end. Thus, by inserting the pin means 34 through the upper end of the float and leading, of course, with the small end 39 of the pin means 34 the assembled locked-together relation of the parts will be effected when the pin means 34 is positioned as shown in FIGURES 1 and 2 with the lower end 39 projecting beyond the surface 24 and the upper end 40 projecting beyond the surface 23.

In order to use the float on the fishing line L as either a slip float or a locked on float, one apical portion of the pin means 34, for example, the apical portion between the sides 36 and 37 is relieved as at 41. The relieved portion 41 is selectively disposed opposite the apical portions 31, 32 or 33 of the wall portions forming the passage 12 whereupon one of the side walls 36, 37 or 38 of the pin means 34 completely closes the slot 30. When assembled, therefore, the fishing line L is either closely confined between the walls of the passage 12 and the pin means 34 for lock-on assembly on the line L or in the longitudinally extending relief or groove 41 for use as a slip-type float. It will be understood, that the parts should be proportioned in size so tight clamping may be effected on the fishing line L in final assembled position while yet accommodating and facilitating ready insertion of the pin means 34 into the passage 12.

In the form of FIGURE 6, the pin means 34a is of cylindrical configuration corresponding to the cylindrical cross-sectional configuration of the passage 12a. Moreover, the pin means 34a is tapered in longitudinal direction to provide a tapered wedging friction lock when the pin means 34a is inserted into the passage 12a.

It will be appreciated that the pin means 34a is relatively rotatable in the passage 12a. Accordingly, the peripheral surfaces of the pin means 34a and the passage 12a may be particularly characterized by a plurality of circumferentially spaced longitudinally extending grooves 42a and 42b of different preselected sizes to accommodate different sizes of fishing lines. Each groove 42a in the pin means 34a may be placed in initial position in register with the slot 30a. In such a position, a fishing line such as the line L is readily and conveniently passed through the slot 30a and into the groove 42a whereupon the pin means 34a is rotated relative to the float 10a out of register with the slot 30a, and opposite a corresponding recess 42b, thereby adapting the float to the line for use either as a slip-type float, or by selecting the size and position of the groove, for lock-on assembly.

If desired the grooves 42a and 42b may be formed either in the pin means alone or in the float body alone, or as shown, in both surfaces. It will also be noted that reinforcing ribs 45 extend between the partition portion 28a and the outer wall of the float body. The ribs 45 not only rigidify and strengthen the float but serve to counterbalance the partition, and stabilize the float.

In the embodiment of FIGURE 7, a pin means 34b is illustrated which is constructed identically with the pin means 34 or 34a, already described, with the additional incorporation of a push button line float. To effect such a push button line float arrangement in the pin means 34b, there is provided a bore which extends axially through the pin means 34b as at 43 which bore is counterbored as at 44 to provide a shoulder 46 bottoming one end of a coil spring 47 having its opposite end engaging against the lower surface 48 of a push button 49. The push button 49 has securely fastened thereto a wire form member 50 which extends through the bore 43 and has formed on its opposite end a reversely turned hook portion 51. A recess 52 is formed in an end surface 53 of the pin means 34b and is displaced from the bore 43 to receive the hook extremity 51, thereby to clamp a fishing line L between the hook 51 and the surface 53 when the line L is inserted under the hook.

To selectively expose the hook 51, the push button 49 is actuated against the spring bias of the spring 47. The button 49 is sized so a portion 54 protrudes beyond an upper surface 56 of the pin means 34b to form a finger-manipulable part.

One of the advantages of the present invention is that different size pin means 34 may be provided, for example, long pins, short pins, end-slotted pins or, as shown, non-slotted pins and push button pins. Thus by simple substitution of an appropriate pin, the entire float is instantly changed.

Although various minor modifications might be suggested by those versed in the art, I wish to embody within the scope of the patent warranted thereon, all such modifications as reasonably and properly come within the scope of my contribution to the art.

I claim as my invention:

1. A fishing float comprising two fitted together parts forming a hollow buoyant body, both of said parts having circumferentially discontinuous peripheral walls terminating in spaced relation to form a slotted opening in the float body and further including generally parallel wall portions extending laterally inwardly of said slotted opening to form a slot extending axially of the float, said parallel wall portions forming and terminating in a centrally disposed post portion having an enlarged axial passage inwardly of said slot, whereby a fishing line can be moved through said slot into said enlarged axial passage, and a pin means in said enlarged axial passage for locking said body to a line inserted in the enlarged axial passage, said passage and said pin means being of triangular cross-section and said pin means having one corner thereof relieved to form with the adjoining passage walls a recess in which the fishing line is positioned for use of the float as a slip-type float when the pin means and the float body are assembled with one another.

2. A fishing float comprising two fitted together parts forming a hollow buoyant body, both of said parts having circumferentially discontinuous peripheral walls terminating in spaced relation to form a slotted opening in the float body and further including generally parallel wall portions extending laterally inwardly of said slotted opening to form a slot extending axially of the float, said parallel wall portions forming and terminating in a centrally disposed post portion having an enlarged axial passage inwardly of said slot, whereby a fishing line can be moved through said slot into said enlarged axial passage, and a pin means in said enlarged axial passage for locking said body to a line inserted in the enlarged axial passage, said pin means and said passage being of conforming equilateral triangular configuration and having adjoining wedge surface portions locking said pin means in assembly with said body, said pin means having end portions extending beyond the ends of said float body at opposite ends of said passage, said slot intersecting said passage intermediate one side thereof opposite an apical portion of said passage, said pin having a relieved corner received in said apical portion of said passage and forming together therewith a recess in which the fishing line is positioned for use as a slip-type float when the pin means and the float body are assembled together.

3. A fishing float comprising a hollow buoyant body having circumferentially discontinuous peripheral walls terminating in spaced relation to form a slotted opening in the float body and further including generally parallel wall portions extending laterally inwardly of said slotted opening to form a slot extending axially of the float, said parallel wall portions forming and terminating in a centrally disposed post portion having an enlarged axial passage inwardly of said slot, whereby a fishing line can be moved through said slot into said enlarged axial passage, and a pin means in said enlarged axial passage for locking said body to a line inserted in the enlarged axial passage, said passage and said pin means being of triangular cross-section and said pin means having one corner thereof relieved to form with the adjoining passage walls a recess in which the fishing line is positioned for use of the float as a slip-type float when the pin means and the float body are assembled with one another.

4. A fishing float comprising a hollow buoyant body having circumferentially discontinuous peripheral walls terminating in spaced relation to form a slotted opening in the float body and further including generally parallel wall portions extending laterally inwardly of said slotted opening to form a slot extending axially of the float, said parallel wall portions forming and terminating in a centrally disposed post portion having an enlarged axial passage inwardly of said slot, whereby a fishing line can be moved through said slot into said enlarged axial passage, and a pin means in said enlarged axial passage for locking said body to a line inserted in the enlarged axial passage, said passage and said pin means being of conforming angular cross-section and said pin means having the outer peripheral surface thereof relieved at one angular corner to form with the adjoining passage walls a recess in which the fishing line is positioned for use of the float as a slip-type float when the pin means and the float body are assembled with one another.

5. A fishing float as defined in claim 3, said pin means having a bore extending therethrough, said bore being counterbored to provide a recess in one end thereof, a spring-biased button in said recess having a wire form member attached thereto and extending slidably through said bore to the other end of said pin means, said wire form member having a reversely turned hook portion engaging against the adjoining end surface of said pin means to lock a fishing line inserted between the hook and the end surface of the pin means.

6. A fishing float as defined in claim 3, and an annular gasket between the two fitted-together parts, said parts and said gasket having interfitting groove and detent means locking the parts in sealed-together assembly.

7. A fishing float as defined in claim 3, said pin means and said passage having formed therein a plurality of longitudinal grooves of different cross-sectional size to receive different size fishing lines.

References Cited in the file of this patent

UNITED STATES PATENTS

| | | |
|---|---|---|
| 668,254 | Dickinson | Feb. 19, 1901 |
| 2,315,048 | Croft | Mar. 30, 1943 |
| 2,388,297 | Slaughter | Nov. 6, 1945 |
| 2,444,791 | Stahnke et al. | July 6, 1948 |
| 2,570,293 | Vadnais | Oct. 9, 1951 |
| 2,763,088 | Cowsert | Sept. 18, 1956 |
| 2,849,827 | Gardiner | Sept. 2, 1958 |
| 2,881,551 | Atton | Apr. 14, 1959 |